(12) United States Patent
Burchard et al.

(10) Patent No.: US 8,065,493 B2
(45) Date of Patent: Nov. 22, 2011

(54) MEMORY CONTROLLER AND METHOD FOR COUPLING A NETWORK AND A MEMORY

(75) Inventors: Artur Tadeusz Burchard, Eindhoven (NL); Ewa Hekstra-Nowacka, Waaire (NL); Peter Van Den Hamer, Waaire (NL); Atul Pratap Chauhan, Farrukhabad (IN)

(73) Assignee: NXP B.V., Eindhoven (NL)

( * ) Notice: Subject to any disclaimer, the term of this patent is extended or adjusted under 35 U.S.C. 154(b) by 584 days.

(21) Appl. No.: 11/917,020

(22) PCT Filed: Jun. 9, 2006

(86) PCT No.: PCT/IB2006/051842
§ 371 (c)(1),
(2), (4) Date: Sep. 22, 2008

(87) PCT Pub. No.: WO2006/131900
PCT Pub. Date: Dec. 14, 2006

(65) Prior Publication Data
US 2009/0083500 A1 Mar. 26, 2009

(30) Foreign Application Priority Data
Jun. 9, 2005 (EP) .................................... 05105094

(51) Int. Cl.
*G06F 12/00* (2006.01)
(52) U.S. Cl. ................................. 711/154; 711/E12.001
(58) Field of Classification Search .................. None
See application file for complete search history.

(56) References Cited

U.S. PATENT DOCUMENTS

| 6,557,053 B1 | 4/2003 | Bass et al. |
| 6,647,439 B1 | 11/2003 | De Perthuis et al. |
| 2002/0046251 A1 | 4/2002 | Siegel |
| 2004/0103218 A1* | 5/2004 | Blumrich et al. ............. 709/249 |

FOREIGN PATENT DOCUMENTS

| WO | 2005020062 A1 | 3/2005 |
| WO | 2006059283 A2 | 6/2006 |

(Continued)

OTHER PUBLICATIONS

PCI Express System Architecture by R. Budruk, D. Anderson & T. Shanley, MindShare Inc. Jul. 2004, pp. 82-84.*

(Continued)

*Primary Examiner* — Pierre-Michel Bataille
*Assistant Examiner* — John P Fishburn

(57) ABSTRACT

A memory controller (SMC) is provided the for coupling a memory (MEM) to a network (N). The network (N) comprises at least one network interface (PCIEI) having network interface buffers (TPB, FCB) for implementing a flow control across the network (N). The memory controller (SMC) comprises a buffer managing unit (BMU) for managing the buffering of data from the network (N) to exchange data with the memory (MEM) in bursts. The buffer managing unit (BMU) furthermore monitors the network interface buffers (TPB, FCB) in order to determine whether sufficient data is present in the network interface buffers (FCB) such that a burst of data can be written to the memory (MEM) and whether sufficient space is available in the network interface buffers (TPB) such that a burst of data from the memory (MEM) can be buffered in the network interface buffers (TPB). The buffer managing unit (BMU) controls the access to the memory (MEM) according to according to the data and/or space in the network interface buffers (FCB, TPB).

16 Claims, 3 Drawing Sheets

FOREIGN PATENT DOCUMENTS

WO    2006134550 A2    12/2006

OTHER PUBLICATIONS

Burchard A; et al "A Real-Time Streaming Memory Controller" Design, Automation and Test in Europe, 2005. Proceedings Munich, Germany Mar. 7-11, 2005, pp. 20-25.

De Kock, E. A; et al "YAPI: Application Modeling for Signal Processing Systems" Proceedings of the Design Automation Conference, IEEE, Jun. 2000, pp. 402-405.

Hennessy, J. L; et al "Computer Architecture. A Quantitative Approach Passage" Computer Architecture. A Quantitative Approach, Morgan Kaufmann Publishers, US, 2003, pp. 435-442.

Ajanovic, J; et al "Multimedia and Quality of Service Support in PCI Express Architecture" White Paper, Intel Corporation, Sep. 19, 2002.

Solari, E; et al "The Complete PCI Express Reference; Design Implications for Hardware and Software Developers" Intel Press, 2003, pp. 74-78.

* cited by examiner

MEMORY CONTROLLER AND METHOD FOR COUPLING A NETWORK AND A MEMORY

The present invention relates to a memory controller, and method for coupling a network and a memory.

The complexity of advanced mobile and portable devices increases. The ever more demanding applications of such devices, the complexity, flexibility and programmability requirements intensify data exchange inside the devices. The devices implementing such applications often consist of several functions or processing blocks, here called subsystems. These subsystems typically are implemented as separate ICs, each having a different internal architecture that consists of local processors, busses, and memories, etc. Alternatively, various subsystems, may be integrated on an IC. At system level, these subsystems communicate with each other via a top-level interconnect, that provides certain services, often with real-time support. As an example of subsystems in a mobile phone architecture we can have, among others, baseband processor, display, media processor, or storage element. For support of multimedia applications, these subsystems exchange most of the data in a streamed manner. As an example of data streaming, reference is made to read-out of an MP3 encoded audio file from the local storage by a media-processor and sending the decoded stream to speakers. Such communication can be described as a graph of processes connected via FIFO buffers, often referred to as Kahn process networks. The Kahn process network can be mapped on the system architecture, as described in E. A. de Kock et al., "YAPI: Application modeling for signal processing systems". In Proc. of the 37th. Design Automation Conference, Los Angeles, Calif., June 2000, pages 402-405. IEEE, 2000. In such an architecture the processes are mapped onto the subsystems, FIFO buffers on memories, and communications onto the system-level interconnect.

Buffering is essential in a proper support of data streaming between the involved processes. It is quite natural to use FIFO buffers for streaming, and it is in accordance to (bounded) Kahn process network models of streaming application. With increased number of multimedia applications that can run simultaneously the number of processes, real-time streams, as well as the number of associated FIFOs, substantially increases.

Within many systems-on-chip (SoC) and microprocessor systems background memory (DRAM) are used for buffering of data. When the data is communicated in a streaming manner, and buffered as a stream in the memory, pre-fetch buffering can be used. This means that the data from the SDRAM is read beforehand and kept in a special (pre-fetch) buffer. When the read request arrives it can be served from local pre-fetch buffer, usually implemented in on-chip SRAM, without latency otherwise introduced by background memory (DRAM). This is similar to known caching techniques of random data for processors. For streaming, a contiguous (or better to say a predictable) addressing of data is used in a pre-fetch buffer, rather then a random address used in a cache. Reference: J. L. Hennessy and D. A. Patterson "Computer Architecture—A Quantitative Approach"

On the other hand, due to DRAM technology, it is better to access (read or write) DRAM in bursts. When a single word is accessed from a DRAM memory, an overhead is needed in order to perform a pre-fetching of a memory page from the data array of the DRAM to the sense amplifiers after the ACTVATE command has been issued. When the data have been transferred to the sense amplifiers, an initial time for decoding the data address and for transferring the data to output buffers are required to retrieve the activated data from the sense amplifiers after an READ command. Such an overhead can easily be calculated for a DRAM memory based on its specification. Typically, such an overhead is in the order of a few clock cycles ($T_{active\_to\_read} + T_{read\_to\_data} = T_{RCD} + T_{CAS} = 2 + 3 = 5$ clock cycles).

To enable burst accesses to the DRAM memory, a write-back buffer is implemented, which gathers many single data accesses into a burst of accesses of a certain burst size. Once the initial processing is done for the first DRAM access, every next data word, with address in a certain relation to the previous one (e.g. next, previous—depending on a burst policy), i.e. within a streaming processing, accessed in every next cycle of the memory can be stored or retrieved without any further delay (within 1 cycle), for a specified number of accesses (e.g. 2/4/8/full page). Therefore, for streaming accesses to memory, when addresses are increased or decreased in the same way for every access (e.g. contiguous addressing) the burst access provides the best performance in terms of the highest throughput at the lowest power dissipation per accessed data unit. For more information regarding the principles of a DRAM memory, please refer for example to Micron's 128-Mbit DDRRAM specifications, http://download.micron.com/pdf/datasheets/dram/ddr/128MbDDRx4x8x16.pdf, which is herein incorporated by reference.

If such a functionality is to be implemented in a memory controller for a DRAM memory, an internal buffering must be present. The internal buffering of the memory controller may also be used for data caching, pre-fetch and write-back buffers, streaming and arbitration.

Quite often, a DRAM memory is accessed via a network or a bus, therefore a memory controller for a DRAM memory can be coupled to an on/off-chip network, which may implement some kind of flow control mechanism. A flow control mechanism is typically implemented by buffering data in every network node within the network until an acknowledgment is received from a subsequent node within the network hierarchy that buffers of the receiving node have sufficient space available to store the data package to be transferred to the receiving node. The advantage of such a flow control mechanism is that a reliable transfer is provided as a buffer underflow/overflow is prevented.

FIG. 4 shows an example of a block diagram of a transmitting node (source device SD) and a receiving node (destination device DD). The source device SD comprises a transaction pending buffer TPB, a transmit unit TU, a receive unit RU, a receive flow control packet unit RFCP, a credit limit register CLR, a credit consumed register CCR and a flow control unit CU. The transaction pending buffer TPB is used to buffer any pending transactions. The transmit unit TU is used to transmit data packets to a destination device DD. The receive unit RU is used to receive any data from the destination device DD. The receive flow control packet unit RFCP is used to retrieve any flow control packets from the destination device DD. According to the retrieve flow control packets of the destination device DD a credit limit CL is stored in the credit limit register CLR. The credit consumed register CCR is used to store credits consumed CC. The control unit CU serves to compare the credit limits CL and the credits consumed. If the difference between the credit limits CL and the credits consumed is bigger than the data size of the transaction pending in the transaction pending buffer TPB, then the transaction can be sent, otherwise further credits are awaited from the destination device DD.

The destination device DD comprises a receive unit RU, a transmit unit TU, a transmit flow control packet unit TFCP, a credits available register CAR and a flow control buffer FCB. If a transaction is received by the receive unit RU from the source device SD, such a transaction is stored in the flow control buffer FCB. As soon as this transaction leaves the flow control buffer FCB, the credits available register CAR is increased. According to the credits available CA in the credits available register CAR, flow control packets are prepared in the transmit flow control packet unit TFCP and forwarded to the transmit unit TU which transmits the flow control packets to the source device SD.

For more information regarding such a network implementing a flow control mechanism, please refer to "PCI Express Base Specification, Revision 1.0", PCI-SIG, July 2002, www.pcisig.org; Jasmin Ajanovic and Hong Jiang, "*Multimedia and Quality of Service Support in PCI Express Architecture*", White Paper, Intel Corporation, Sep. 19, 2002; Edward Solari and Brad Congdon, "*The Complete PCI Express Reference*", Intel Press, 2003. These three documents are incorporated herein by reference.

FIG. 5 shows a block diagram of an architecture with a combination of a network implementing a flow control with a memory control and a SDRAM memory. The network N may comprise several flow control buffers FCB as well as several transaction pending buffers TPB. The network N may also comprise further elements like a flow control logic which are omitted to improve the clarity of FIG. 5. The memory controller MC may comprise a write buffer WB and a read buffer RB. The write buffers WB and read buffers RB are required as the access to the SDRAM memory is preferably operated based on bursts. The data is transferred to the write buffer WB as it arises from the network N. The buffering in the flow control buffers FCB in the network are performed in order to satisfy the network flow control mechanism. In the write buffer WB, data is gathered until a specified burst of data is available and is then written to the memory within a single burst. The first few read transaction requests are gathered in the write buffer WB for the data to be transferred from the memory and the data is then transferred from the memory to the read buffer RB in a single burst. Thereafter, the data is transferred to the transaction pending buffer TPB in the network.

It is an object of the invention to provide a memory controller for coupling a network and a memory as well as a method for coupling a network and a memory, having an improved flow control mechanism between the network and the memory.

This object is solved by a memory controller according to claim 1 and by a method for coupling a network and a memory according to claim 6.

Therefore, a memory controller is provided for coupling a memory to a network. The network comprises at least one network interface having network interface buffers for implementing a flow control mechanism across the network. The memory controller comprises a buffer managing unit for managing the buffering of data from the network to exchange data with the memory in bursts. The buffer managing unit furthermore monitors the network interface buffers in order to determine whether sufficient data is present in the network interface buffers such that a burst of data can be written to the memory and whether sufficient space is available in the network interface buffers such that a burst of data from the memory can be buffered in the network interface buffers. The buffer managing unit controls the access to the memory according to the amount of data and/or space available in the network interface buffers.

The advantages of the above-mentioned implementation of the buffering of the memory controller by using network interface buffers (the flow control buffer and the transaction pending buffer) is advantageous as the silicon utilization is improved. The separate implementation of flow control buffers of a (PCI express) interface and the burst buffers inside the memory controller require a larger silicon area, which is avoided. Furthermore, unnecessary data copying is avoided as well such that less activity is required and thus less power is required. A single buffer (a single buffer for a read and a single for a write) instead of two is advantageous regarding the delay/latency as its delay and latency will be smaller than those of separate buffers. The flow control buffers at the network interface do not have to be structurally changed.

According to an aspect of the invention, the network interface is implemented as a PCI-Express interface such that the properties and network services of a PCI-Express network can be implemented by the memory controller.

According to an aspect of the invention, the buffer managing unit comprises a first register for storing the amount of space in the network interface buffer, a second register for storing the amount of data in the network interface buffer, and a control means for controlling the access to and from the memory according to the amount of space, the amount of data and a burst size. The buffer managing unit can be implemented by simple logic circuitry.

According to an aspect of the invention, the buffer managing unit receives first information, when data is forwarded from the network interface to the network, and second information, when data is forwarded from the network interface to the memory, in order to update the first and second register.

According to an aspect of the invention, network interface buffers are provided for each flow control virtual channel. As the flow control buffers are implemented for each virtual channel separately, the differentiation between different streams need not to be implemented in the controller.

The invention also relates to a method for coupling a memory to a network, wherein the network comprises at least one network interface with buffers for implementing a flow control across the network. The buffering of data from the network to exchange the data with the memory bursts is managed by a buffer managing unit. The buffers within the network interface are monitored to determine whether sufficient data is present in the buffer such that a burst of data can be written to the memory and whether sufficient space is available in the buffers such that a burst of data from the memory can be buffered in the buffers of the network interface. The access to the memory is controlled according to the amount of data and/or space in the network interface buffers.

The invention relates to the idea to utilize the network interface buffers, which are used to implement the flow control mechanism, as burst buffers of a memory controller. Although the implementation of such a flow control buffer and the transaction pending buffer is bigger than the respective one according to the prior art, the flow control buffers and transaction pending buffers will be smaller than the sum of a flow control buffer and a prior art burst buffer in a memory controller for a (SDRAM) memory.

Other aspects of the invention are subject to the dependent claims.

These and other aspects of the invention are apparent from and will be elucidated with reference to the embodiments described hereinafter and with respect to the following figures.

Figure 4:
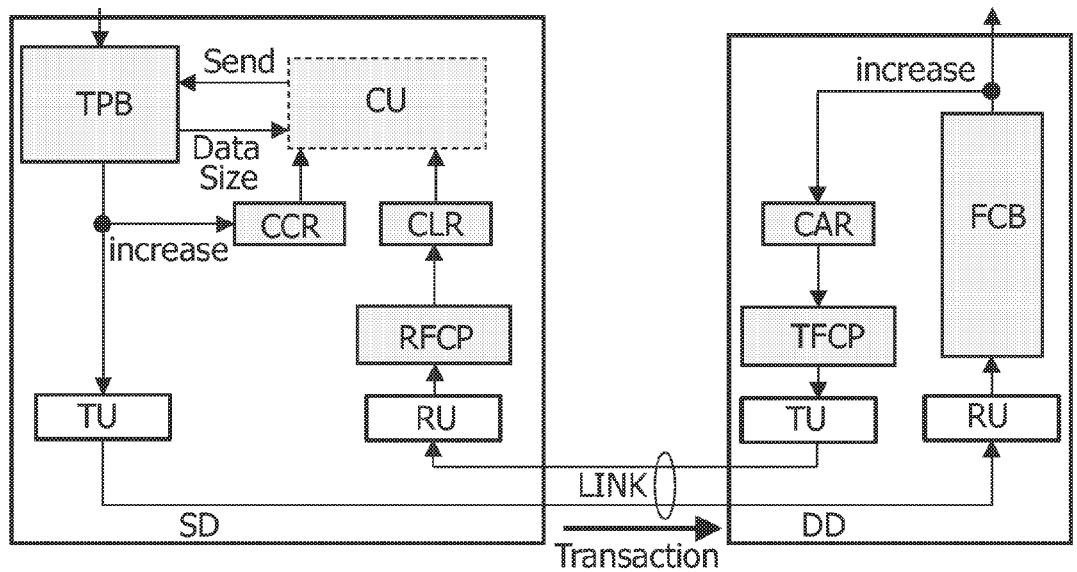
Figure 5:
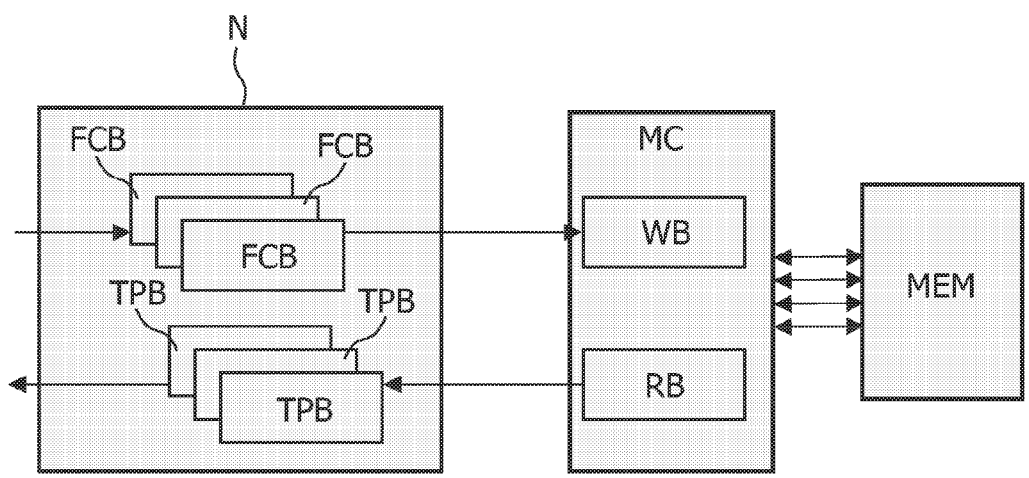

FIG. 4 block diagram of a source device and a destination device within a network according to the prior art, and FIG. 5 shows a block diagram of a memory controller, a network and a memory according to the prior art.

Figure 1:
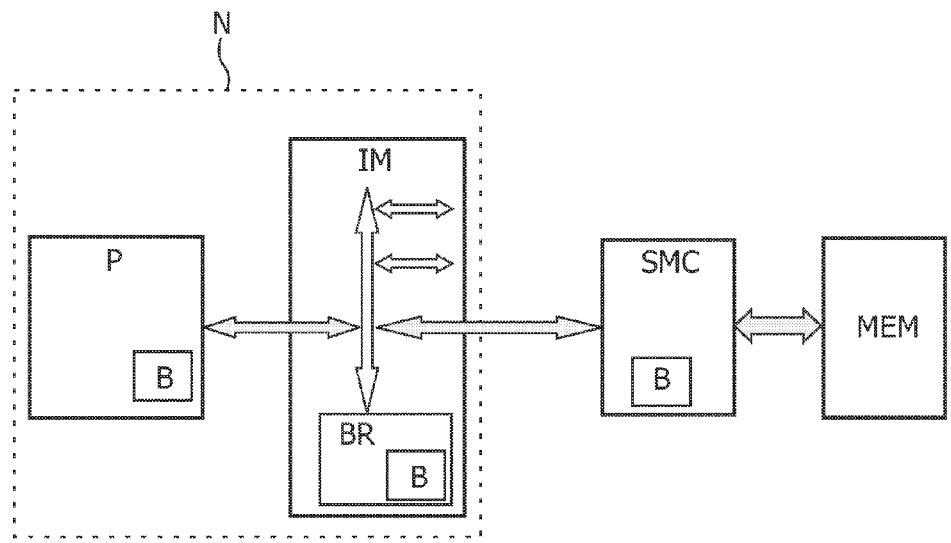
FIG. 1 shows a block diagram of the basic architecture of a system on chip according to the invention.

FIG. 1 shows a block diagram of the basic architecture of a system on chip according to the invention. The system on chip comprises at least one processing unit P (please note that only one processing unit is shown in FIG. 1) or subsystem, an interconnect means IM for coupling the processing units P and any external devices. The processing units P and the interconnect means IM can be considered as a network N. Alternatively, the interconnect means IM may be considered as a network N. The communication over the interconnect means IM and between the processing units P is performed in a streaming manner. An (external) memory MEM is coupled to the interconnect means IM or the network N via a memory controller SMC. The (external) memory can be implemented as a DRAM memory (e.g. a SDRAM or a DDR-SDRAM memory). The memory controller SMC serves to translate data format and the addresses format of the interconnect means IM or the network N into data format and address format of the memory MEM.

To implement the stream based communication buffers are provided. The buffer can be placed in a memory controller SMC close to the memory MEM. However, the buffer may also be placed in the interconnect infrastructure (e.g. in an arbiter or in a bridge BR), or even close to the subsystem P, which may be implemented as dedicated ASIC or a microprocessor, accessing the memory MEM. The buffer B will preferably be implemented as a SRAM. Preferably, the FIFO (First-in First-out) principle will be employed to organize the data flow of the data stream through the buffer. Additionally, there may be more then a single buffer implemented in the system. One reason for that would be a differentiation between many streams, and therefore implementing one buffer per single stream.

Preferably, the network constitutes a PCI-Express network. The basic concept of a PCI-Express network is described in "PCI Express Base Specification, Revision 1.0", PCI-SIG, July 2002, www.pcisig.org.

One feature of a PCI-Express network to ensure a quality of service, i.e. the ability of the network to provide predictable latency and bandwidth, is the provision of the virtual channels VC. The virtual channel mechanism provides a support for carrying data for different classes of traffic with different priorities. The virtual channel VC typically comprises independent fabric resources like queues, buffers and associated control logic. Traffic flow through virtual channels VC is multiplexed onto a common physical link resource on the transmitting side and de-multiplexed into separate virtual channel VC on the receiving side.

Ports at each end of a PCI-Express link can be used to implement the flow control. Before a transaction packet can be sent across a link to the receiving port or receiving side, the transmitting port must verify that the receiving port has sufficient buffer space to accept the transaction that is to be sent. Flow control buffers are therefore provided for the different virtual channels. The flow control is managed separately for each virtual channel for a given link.

Figure 2:
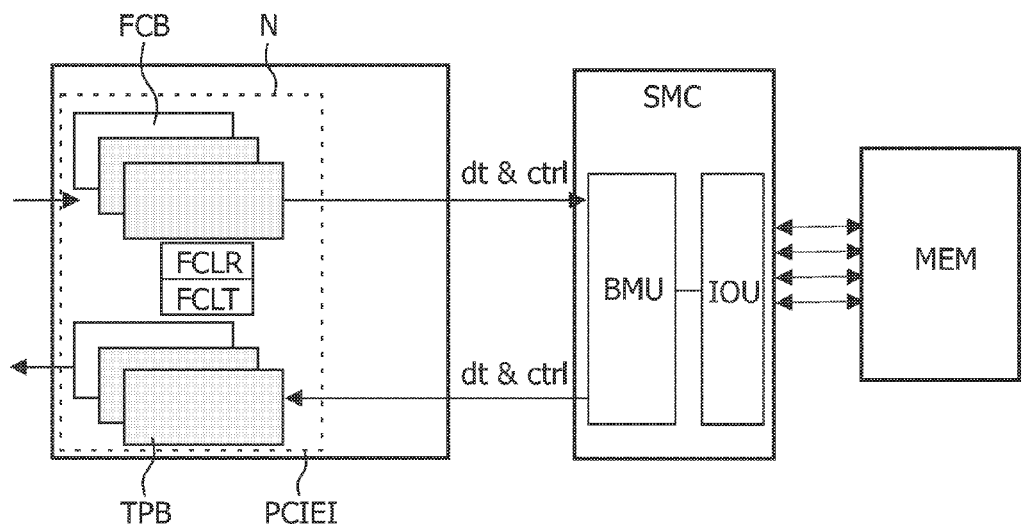
FIG. 2 shows a block diagram of a memory controller SMC, a network N and a memory MEM according to a first embodiment.

FIG. 2 shows a block diagram of a memory controller SMC, a network N and a memory MEM according to a first embodiment. The memory controller SMC comprises a PCI-Express interface, a buffer memory unit BMU and an interface IOU which serves as interface to an external SDRAM memory MEM. The PCI-Express interface PI, the buffer managing unit BMU and the interface IOU are used to buffer an access from the network N to the SDRAM memory as well an access from the SDRAM memory to the network N and to implement a flow control. The buffer manager unit BMU serves to react to read or write accesses to SDRAM from the PCI-Express Interface, to manage the buffers and to relay data from/to buffers (SRAM) and from/to SDRAM. All above elements are designed to enable a stream-based communication.

The PCI-Express network N comprises a PCI-Express network interface PCIEI which implements among others the flow control mechanism of the network N. The network interface PCIEI comprises several network interface buffers, i.e. flow control buffers FCB, several transaction pending buffers TPB (e.g. a buffer for each virtual channel VC), a flow control logic FCLR for receiving data and a flow control logic FCLT for transmitting data.

According to the first embodiment, the flow control buffers FCB and the transaction pending buffers TPB in the network interface PCIEI are used as the burst buffers, i.e. to buffer data until sufficient data is present to access the DRAM in a burst of the memory controller SMC. This is in particular advantageous as the burst buffers of a DRAM memory controller can be removed and only some simple additional logic need to be added to the memory controller SMC to control the data movement from the flow control buffers FCB and the transaction pending buffers TPB to and from the (S)DRAM memory. Furthermore, the structure of the network interface PCIEI and in particular the structure of the flow control buffers FCB and the transaction pending buffers TPB will basically not change. Preferably, the network N and the network interfaces PCIEI are based on the PCI-Express protocol. The flow control buffers FCB are implemented at the receiving side of the network interface PCIEI for every virtual channel. The transaction pending buffers TPB are implemented at the transmitting side of the network interface.

By using the flow control buffers FCB and the transaction pending buffers TPB to buffer the data (or the burst of data) to and from the memory via the NI, the buffer managing unit BMU can be implemented by simple logic units to control the access to the SDRAM according to the amount of data or space in the flow control buffers FCB and the transaction pending buffers TPB.

Data is gathered in the flow control buffers FCB for every write request coming from the network N until sufficient data is buffered in the flow control buffer FCB to send a data burst to the SDRAM memory MEM. In other words, the data from the write requests are buffered in the flow control buffer FCB until the burst size (e.g. a memory page) is reached and a write burst is issued within a single burst. Read transactions are gathered in the transaction pending buffer TPB until sufficient data is gathered for a read burst. A read burst will occur transferring all data into the transaction pending buffer TPB.

Although the implementation of such a flow control buffer and the transaction pending buffer is bigger than the respective one according to the prior art, the flow control buffers and transaction pending buffers will be smaller than the sum of a flow control buffer and a prior art burst buffer in a memory controller for a SDRAM memory.

Figure 3:
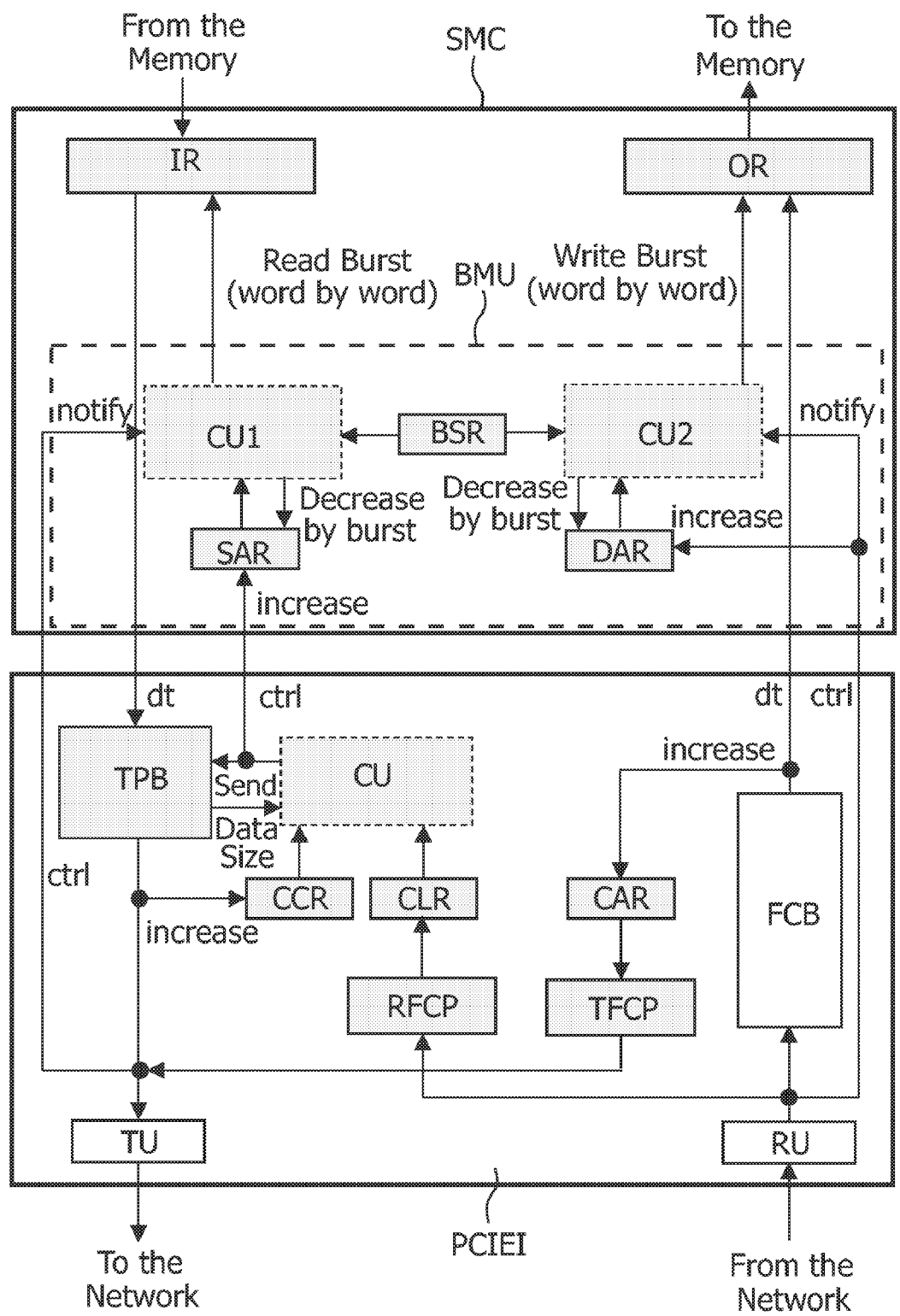
FIG. 3 shows a block diagram of a buffer managing unit and an interface of FIG. 2.

FIG. 3 shows a block diagram of a network interface and a memory controller according to the first embodiment. Here, the network interface PCIEI and the memory controller SMC are shown in more detail. The implementation of the network interface PCIEI substantially corresponds to the implementation of the source device SD and the destination device DD according to FIG. 4. Therefore, three registers or counters are provided, namely the credit consumed register CCR for storing the credit consumed CC (keeping track of all transactions), the credits limited register CLR for storing the credits limit CL and the credit available register CAR for storing the credits available CA. Furthermore, a received flow control packet unit RFCP and a transmit flow control packet unit TFCP is provided. The transmit unit TU transmits data to the network and the receive unit RU receives data from the network. The control unit CU serves to determine whether the difference between the credits limit CL and the credits consumed CC is bigger than the data size. If this is true, data can be transmitted to the network via the transmit unit TU. However, if this is not true, further credits are awaited.

The memory controller SMC comprises an input register IR, an output register OR and a buffer managing unit BMU. The buffer managing unit BMU comprises a space available register or counter SAR for storing the space available SA, a data available register or counter DAR for storing the data available DA, a burst size register BSR for storing the burst size BS, a first control unit CU1 and a second control unit CU2.

The output of the control unit CU in the network interface PCIEI is coupled to the space available counter SAR to increase the count of the space available SA. The input register IR is coupled to the input of the transaction pending buffer TPB for transmitting data dt directly to this buffer. The output of the flow control buffer FCB is coupled to the output register OR for directly forwarding data dt to the output register OR. The output of the receive unit RU is coupled to the data available counter DAR to increase the data available DA count as well as to the second control unit CU2 to notify the unit of newly arrived data. The output of the transaction pending buffer TPB is coupled to the first control unit CU1 for notifying the control unit CU1 that data is transmitted to the network N. The output of the transaction pending buffer TPB is also coupled to the credits consumed register CCR.

At the receiving side of the network interface PCIEI, data dt is arriving from the network N via the receive unit RU and is buffered in the flow control buffer FCB. The second control unit CU2 in the buffer managing unit BMU monitors the actual data inside the flow control buffer FCB to determine whether it exceeds the required burst size BS.

If the data dt inside the flow control buffer FCB exceeds the burst size BS, the data inside the flow control buffer FCB is read word by word from the flow control buffer and is transferred to the memory MEM via the output register OR, i.e. the output buffer. However, if not sufficient data is present in the flow control buffer FCB to form a complete burst, further data are awaited from the network N. In order to keep track of the data inside the flow control buffer FCB, the data available counter DAR is used. This counter is reset to zero at the beginning of the processing. Every incoming data from the network increases the counter and every burst write decreases the counter by a burst size.

For the case of transmitting data to the network N, the transaction pending buffer TPB is filled until the space left inside the buffer is smaller than a single burst size BS. The actual space inside the transaction pending buffer is monitored by the space available counter SAR. In particular, it is monitored whether the space available inside the transaction pending buffer TPB exceeds a burst size BS. If this is true, the data burst is read word by word from the memory MEM via the input register IR and is transferred to the transaction pending buffer TPB. If there is not sufficient space available, the transmission of new data is awaited. In order to keep track of the amount of space available in the transaction pending buffer TPB, the space available counter SAR is used. At the beginning of the processing, the space available counter SAR is reset to the size of the transaction pending buffer. Every data transmitted from the transaction pending buffer to the network N increases the counter and every burst read from the memory MEM decreases the counter by a burst size.

The advantages of the above-mentioned implementation of the buffers of the memory controller by using the flow control buffer and the transaction pending buffer of a network interface PCIEI is advantageous as the silicon utilization is improved. If the flow control buffers of a PCI express interface as well as the burst buffers inside the memory controller are implemented separately, a larger silicon area will be required. Furthermore, unnecessary data copying is avoided such that less activity is required and thus less power is required. A single buffer (a single buffer for a read and a single for a write) instead of two is advantageous regarding the delay/latency as its delay and latency will be smaller than those of separate buffers. As the flow control buffers are implemented for each virtual channel separately, the differentiation between different streams need not to be implemented in the controller. The flow control buffers at the network interface do not have to be structurally changed.

It should be noted that the above-mentioned scheme can be implemented for every system that accesses a DRAM memory through a network implementing a flow control.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. In the device claim in numerating several means, several of these means can be embodied by one and the same item of hardware. The mere fact that certain measures are resided in mutually different dependent claims does not indicate that a combination of these measures cannot be used to advantage.

Furthermore, any reference signs in the claims shall not be constitute as limiting the scope of the claims.

The invention claimed is:

1. A memory controller for coupling a memory to a network having a network interface, wherein the network interface comprises network interface buffers for implementing a flow control across the network, and wherein the memory comprises a Dynamic Random Access Memory (DRAM) for being accessed in bursts via pre-fetch buffers and write-back buffers, the memory controller comprising:
   a buffer managing unit for managing a buffering of data for the exchange of data between the network and the memory in bursts, the buffer managing unit further comprising:
   a data control unit for monitoring the network interface buffers to determine whether sufficient data are present in the network interface buffers such that a burst of data can be written to the memory; and
   a space control unit for monitoring whether sufficient space is available in the network interface buffers such that a burst of data from the memory can be buffered in the network interface buffers, wherein the data control unit and the space control unit control an access to and from the memory according to the data and the space in the network interface buffers and the pre-fetch buffers and the write-back buffers are entirely implemented in the network interface buffers.

2. The memory controller according to claim 1, wherein the network interface is a Peripheral Component Interconnect (PCI) express interface.

3. The memory controller according to claim 2, wherein network interface buffers are provided for a flow control virtual channel.

4. The memory controller according to claim 1, wherein the buffer managing unit further comprises:
 a space available counter that stores an amount of space in the network interface buffer;
 a data available counter that stores an amount of data in the network interface buffer, wherein the buffer managing unit controls access to and from the memory according to the amount of space, the amount of data, and a burst size.

5. The memory controller according to claim 4, wherein the buffer managing unit receives first information, when data is forwarded from the network interface to the network, and second information, when data is forwarded from the network interface to the memory, in order to update the space available counter and the data available counter.

6. A data processing system, comprising:
 a network having at least one network interface for coupling a plurality of processing units;
 a memory for storing data of the plurality of processing units; and
 a memory controller according to claim 1.

7. The memory controller of claim 1, further comprising:
 an input register coupled between the memory and the space control unit.

8. The memory controller of claim 7, wherein the input register is coupled to an input of a transaction pending buffer.

9. The memory controller of claim 1, further comprising:
 an output register coupled between the memory and the data control unit.

10. The memory controller of claim 9, wherein an output of a flow control buffer is coupled to the output register.

11. The memory controller of claim 1, further comprising:
 a burst size register coupled between the data control unit and the space control unit.

12. A method for coupling a memory to a network, wherein a flow control across the network is implemented by network interface buffers in a network interface of the network, wherein the memory comprises a Dynamic Random Access Memory (DRAM) for being accessed in bursts via pre-fetch buffers and write-back buffers, the method comprising:
 managing a buffering of data for the exchange of data between the network and the memory in bursts by a buffer managing unit;
 monitoring, with a data control unit, the network interface buffers to determine whether sufficient data are present in the network interface buffers such that a burst of data can be written to the memory;
 monitoring, with a space control unit, whether sufficient space is available in the network interface buffers such that a burst of data from the memory can be buffered in the network interface buffers; and
 controlling an access to and from the memory according to both the data and the space in the network interface buffers, wherein the pre-fetch buffers and the write-back buffers are entirely implemented in the network interface buffers.

13. The method of claim 12, further comprising:
 increasing a data available counter with each incoming data burst; and
 decreasing the data available counter with each burst write by a burst size.

14. The method of claim 12, further comprising:
 filling a transaction pending buffer until space left inside the transaction pending buffer is smaller than a single burst size as monitored by a space available counter.

15. The method of claim 12, further comprising:
 resetting a size of a space available counter to a size of a transaction pending buffer.

16. The method of claim 12, further comprising:
 increasing a space available counter with each transmitted data burst; and
 decreasing the space available counter with each burst read by a burst size.

* * * * *